(12) United States Patent
Dalton et al.

(10) Patent No.: US 7,606,490 B2
(45) Date of Patent: Oct. 20, 2009

(54) ADAPTIVE PREAMBLE ADJUSTMENT FOR BURST-MODE OPTICAL SYSTEMS

(75) Inventors: Rodger Dalton, Wake Forest, NC (US); Eugen H. Ruegg, Cary, NC (US); Jason Teeter, Apex, NC (US)

(73) Assignee: Alcatel Lucent, Paris (FR)

( * ) Notice: Subject to any disclaimer, the term of this patent is extended or adjusted under 35 U.S.C. 154(b) by 610 days.

(21) Appl. No.: 11/292,131

(22) Filed: Dec. 1, 2005

(65) Prior Publication Data
US 2007/0127923 A1    Jun. 7, 2007

(51) Int. Cl.
*H04J 14/00* (2006.01)
(52) U.S. Cl. .................. 398/71; 398/70; 398/72
(58) Field of Classification Search ............. 398/66–67, 398/70–72
See application file for complete search history.

(56) References Cited

U.S. PATENT DOCUMENTS

| | | |
|---|---|---|
| 4,731,880 A | 3/1988 | Ault et al. |
| 2002/0136203 A1 | 9/2002 | Liva et al. |
| 2003/0020991 A1* | 1/2003 | Chang ..................... 359/168 |
| 2003/0153358 A1* | 8/2003 | Moon et al. ................ 455/561 |
| 2004/0114592 A1* | 6/2004 | Kang et al. ................. 370/389 |
| 2004/0247246 A1* | 12/2004 | Lee et al. ..................... 385/48 |
| 2004/0258410 A1* | 12/2004 | Yajima et al. ................. 398/71 |
| 2005/0260001 A1* | 11/2005 | Sakamoto .................. 398/202 |

OTHER PUBLICATIONS

Ulhorn; A Robust Fiber Optical Active Star Coupler for the SAE Linear Token-Passing Multiplex Data Bus; Proceedings of the IEEE 1998 National Aerospace and Electronics Conference; NAECON 1998; Jul. 13-17, 1998; pp. 160-167.
Lee, et al.; Type-Based Detection for Spread Spectrum; 1997 IEEE International Conference on Communications; ICC 97 Montreal, 'Towards the Knowledge Millennium'; Jun. 8-12, 1997; pp. 1212-1217; vol. 3.

* cited by examiner

*Primary Examiner*—Quan-Zhen Wang

(57) ABSTRACT

In an optical data network, such as a passive optical network (PON), an optical line terminator (OLT) measures the strengths of one or more signals received from the optical network units (ONUs) and generates a message containing an indication responsive to the measured signal strength. The OLT transmits the message to the ONUs. The ONUs generate packets having preambles of a length responsive to the indication contained in the message.

14 Claims, 3 Drawing Sheets

ADAPTIVE PREAMBLE ADJUSTMENT FOR BURST-MODE OPTICAL SYSTEMS

BACKGROUND OF THE INVENTION

1. Field of the Invention

The present invention relates generally to optical power control in a passive optical network (PON) and, more specifically, to adjusting a burst-mode data transmission preamble in response to power measurement.

2. Description of the Related Art

Most digital telecommunications networks (i.e., networks that facilitate the communication of data, voice, video, etc., between parties or between a content distribution service and subscribers) typically comprise active components, such as repeaters, relays and other such devices that consume power, in the path between an exchange and a subscriber. In addition to requiring power, active components are subject to failure and performance degradation over time, and may require significant periodic maintenance. The passive optical network (PON) has been developed to overcome some of these deficiencies. The essence of a PON is that nothing but optical fiber and passive components are found in the path between the exchange and subscribers. A single fiber can run from the exchange to a passive splitter located near a group of subscribers, such as a neighborhood or office complex, and individual fibers can run from the splitter to individual subscribers or sub-groups of subscribers.

The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification for broadband PON (BPON), also referred to as "APON," a reference to the Asynchronous Transfer Mode (ATM) data transmission protocol, and G984.x, a specification for gigabit PON (GPON). These standards and recommendations are well-known to persons skilled in the art to which the invention relates and are therefore not described in further detail herein (i.e., in this patent specification).

In accordance with these standards and recommendations, a PON comprises an optical line terminator (OLT) at the exchange or central office and a number of optical network units (ONUs), also known as optical network terminals (ONTs), each located at or near the subscriber's premises (e.g., home, office building, etc.), with optical fiber and splitters between the OLT and ONUs. In the downstream direction, i.e., data transmitted from the exchange to a subscriber, the data units (e.g., ATM cells, packets, etc.) are broadcast from the OLT to all of the ONUs in the network, and an ONU can select the data to receive by matching the address embedded in the data units to a selected address. In the upstream direction, i.e., data transmitted from a subscriber to the exchange, the data units are time-division multiplexed with those transmitted from other subscribers. BPON and GPON are sometimes referred to as burst-mode PON technologies because they transmit bursts of data packets at relatively high bit rates.

Power control is an important consideration in burst-mode optical networks because it can help minimize data transmission errors. In a PON, bit errors can occur if the amplitude of upstream data packet bits received at the OLT is outside the OLT receiver operating range. In other words, it is important that the signal be neither too powerful for the OLT receiver and thus overload it nor too weak for the OLT receiver and thus become obscured by noise. The amplitude of the upstream signal received at the OLT can vary from ONU to ONU for a number of reasons, including the number of splits in the paths and the different distances from the OLT at which the ONUs may be located.

One power control mechanism set forth in the G984 specifications, known as "Power Leveling," involves the OLT measuring the average amplitude of a packet received from an ONU and, if the amplitude is outside the OLT receiver sensitivity range, transmitting a command to that ONU that causes it to adjust its transmission power upwards or downwards.

The G984 specifications also provide for the OLT to account for differences in amplitude by "training" its receiver to each upstream packet, i.e., adjusting itself to the amplitude range of that packet, in order to receive the packet data without errors. The G984 specifications provide for inclusion of a preamble preceding the data bits of each packet to use in training the OLT receiver. The required training time depends largely upon the amplitude difference between consecutive upstream packets. That is, a very bright packet received at a high optical power level from an ONU close to the OLT followed by a dimmer packet received at a lower optical power level from an ONU farther from the OLT creates a difficult situation for the OLT receiver, requiring a long recovery time before being able to receive the next packet. The greater the amplitude difference between such consecutive packets, the longer the training time that is needed, and thus the longer the preamble that is needed. Conventional systems are designed to use a preamble of a predetermined or fixed length that is long enough to accommodate the largest (i.e., worst-case) amplitude difference that is specified by the ITU or IEEE standards. An amplitude difference of 15 dB is typically used as this worst-case difference. (See ITU G984 standard.) A preamble long enough to train an OLT receiver in the case of such a worst-case amplitude difference can consume up to 10 percent of the available upstream bandwidth.

However, in PONs likely to be used commercially, the amplitudes of signals received at the OLT are unlikely to vary much from ONU to ONU—much less than the worst-case 15 dB—because ONUs are generally located at about the same distance from the OLT. Thus, the worst-case amplitude difference is believed to be very conservative for most commercially viable PONs. It would be desirable to provide a method and system that maximizes upstream data transmission bandwidth without compromising bit error rate. The present invention addresses these problems and deficiencies and others in the manner described below.

SUMMARY OF THE INVENTION

The present invention relates to a method and system for adjusting data transmission packet preamble length in an optical network to a length that does not unnecessarily consume bandwidth. In accordance with one or more embodiments of the invention, the strengths of signals received at the optical line terminator (OLT) from the optical network units (ONUs) are measured, and the OLT generates a message containing an indication responsive to the measured signal strengths. The OLT transmits the message to the ONU, which causes the ONU to generate packets having preambles of a length responsive to the indication. The signal strengths can be measured in any suitable manner at any suitable time. For example, in embodiments of the invention in which the OLT includes an integral signal strength measuring system, the OLT can measure signal strengths. In other embodiments, signal strengths can be measured using other means, and the results can be provided to the OLT (e.g., as part of a provisioning or setup process, prior to actual use of the PON).

In one preferred form, the amplitudes of signals received from ONUs in the network are measured, and the ratio of the highest measured amplitude to the lowest measured amplitude is calculated. The indication responsive to the measured signal strength is then determined in response to the ratio. For example, the OLT can reference a look-up table that associates ratio values with preamble lengths or values related to preamble lengths. In general, the greater the ratio, which can be said to represent the dynamic range of the system, the longer the preamble the ONUs need to include in the packets they transmit in order for the OLT receiver to adequately train or sensitize to packets having amplitudes in the range indicated by the ratio. In this manner, each packet generated by an ONU can be made to have a preamble that is not significantly longer than necessary to train the OLT to be sensitive to the amplitude of packets received from that ONU. Minimizing the preamble length in this manner maximizes the bandwidth available for data transmission.

BRIEF DESCRIPTION OF THE DRAWINGS

FIG. 3 illustrates exemplary data packets having long preambles adjusted in accordance with the method of FIG. 2 while

DETAILED DESCRIPTION

Figure 1:
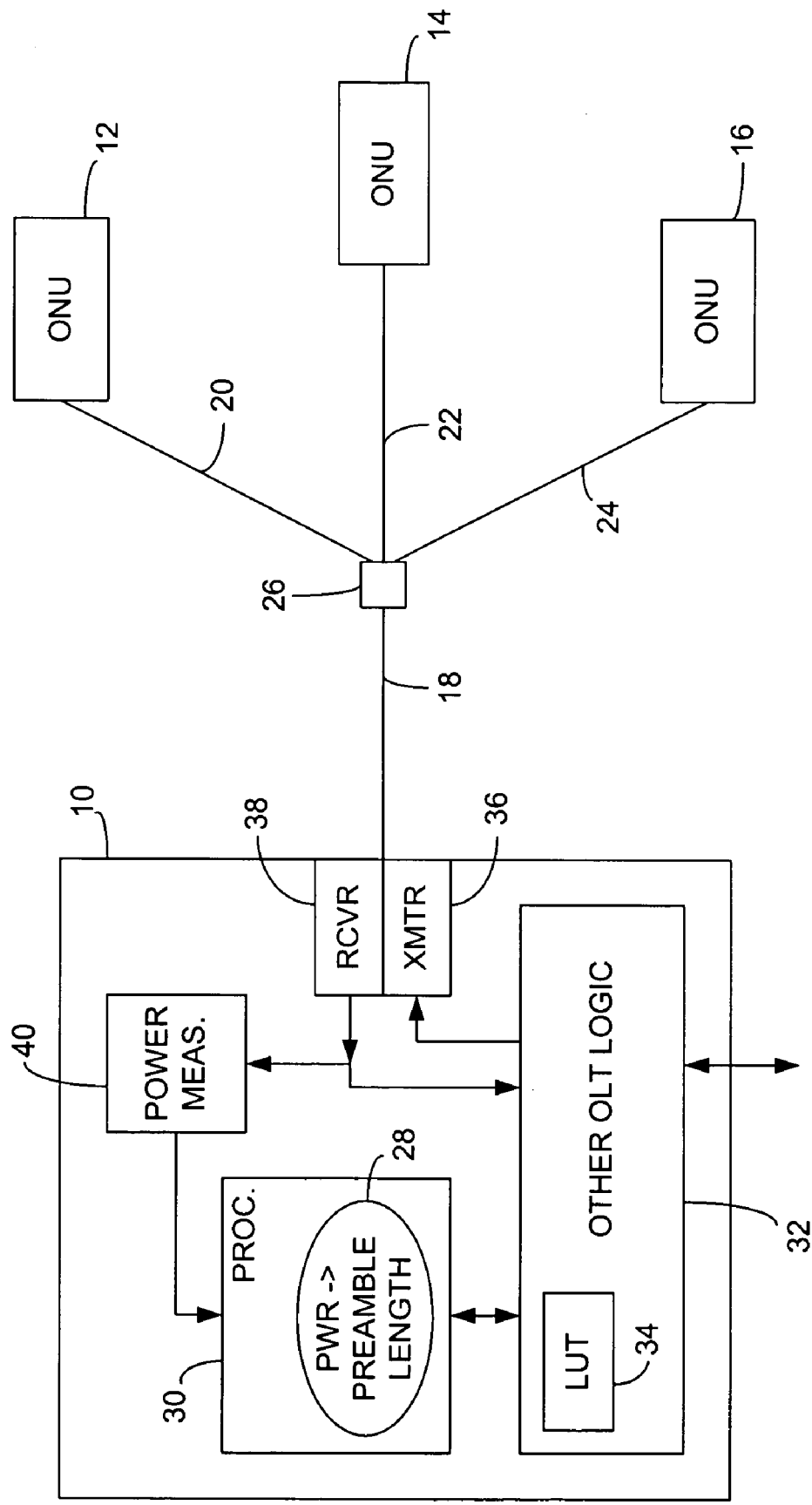
FIG. 1 is block diagram of a passive optical network (PON) in accordance with an exemplary embodiment of the invention.

As illustrated in FIG. 1, in an exemplary embodiment of the present invention a passive optical network (PON) includes an optical line terminator (OLT) 10 and a number of optical network units (ONUs) 12, 14, 16, etc. The OLT 10 is interconnected in the conventional manner with each ONU 12, 14, 16, etc., by optical fibers 18, 20, 22, 24, etc., and one or more optical splitters 26, etc. Although only one such splitter 26 and three such ONUs 12, 14 and 16 are shown for purposes of illustration, the PON can have any other suitable topology and number of ONUs, splitters, fibers, etc. The OLT 10 can be located at, for example, an exchange or central office from which services such as distribution of television programming and provision of Internet access are operated. The ONUs 12, 14, 16, etc., can be located at, for example, residences or other premises occupied by subscribers to such services. Although data communication in the PON is bidirectional, the present invention relates primarily to data communication in the upstream direction, i.e., from any of ONUs 12, 14, 16, etc., to OLT 10. The communication of data on the PON occurs in the manner well-understood in the art, using any of a number of suitable conventional technologies, such as asynchronous transfer mode (ATM) protocol, and is therefore not described herein in further detail. The present invention relates not to the communication protocols or content of what is communicated, but rather to the data packets, specifically, the data packet preamble length.

Figure 2:
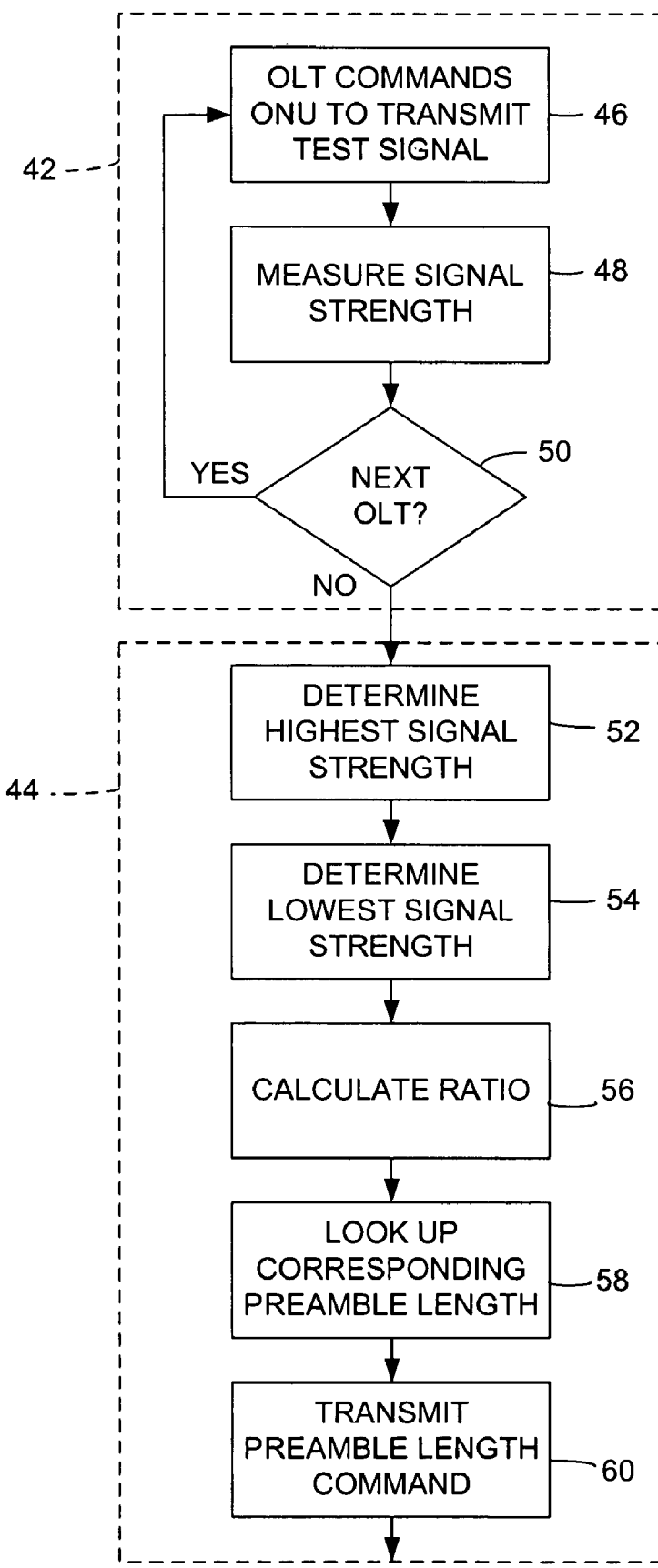
FIG. 2 is flow diagram of a method for adjusting data packet preamble length in response to measured signal strength in the PON of FIG. 1.

The OLT 10 is programmed or configured in accordance with the present invention to include control logic 28, such as suitable software or firmware, which controls the method of operation described below with regard to FIG. 2. The OLT 10 can include a processor 30 for effecting the method in accordance with the control logic 28. Although processor 30 is shown and described with regard to this exemplary embodiment as a separate element for purposes of illustration, in other embodiments the method can be effected by one or more other processors or other elements (not shown) that are included in the other OLT logic 32. The other OLT logic 32 represents logic elements, such as processors, memories, data encoders and decoders, etc., that are conventional and typically included in prior OLTs of the type known in the art. The structure and function of such elements are well-known in the art and therefore not described herein in further detail. Note, however, that other OLT logic 32 is programmed or configured to include a look-up table (LUT) 34 that can be pre-stored in memory and used in the manner described below with regard to the method illustrated in FIG. 2. Although shown and described with regard to this exemplary embodiment as stored in memory that is part of other OLT logic 32 for purposes of illustration, in other embodiments LUT 34 can be stored in a separate memory or any other suitable memory. Indeed, in other embodiments the look-up or relation function of LUT 34 described herein can be performed by any other equivalent or otherwise suitable logic, such as by a processor-executed algorithm.

In addition to the elements described above, OLT 10 includes a transmitter and receiver system comprising an OLT transmitter 36 and an OLT receiver 38. The OLT 10 also includes a signal strength (i.e., optical power) measuring system 40 for measuring the strength of a signal received from any of ONUs 12, 14, 16, etc. Measuring system 40 can be that described in U.S. patent application Ser. No. 11/189,291, filed Jul. 26, 2005, assigned to the assignee of the present invention, and entitled "METHOD AND SYSTEM FOR FACILITATING BURST-MODE OPTICAL POWER MEASUREMENT," which is incorporated herein by this reference, or any other suitable power-measuring system. Note that a conventional OLT (not shown) typically includes such a power-measuring system.

Each of ONUs 12, 14, 16, etc., can be of a conventional type known in the art. As such, each is capable of recognizing and responding to commands or messages received from OLT 10. OLT 10 can transmit a command to a specific one of ONUs 12, 14, 16, etc., by embedding an address corresponding to the selected ONU in the packet data along with data representing the command. As known in the art, one such command can instruct an ONU to set the power level of its transmitter. Another such command can instruct an ONU to set the length of the packet preamble. Still another such command can instruct an ONU to transmit a signal.

As described below, the method illustrated in FIG. 2 results in each of ONUs 12, 14, 16, etc., adjusting its data packet preamble length in response to signal strength measurements. The method can be performed during an initialization period prior to the PON service beginning normal operation (e.g., prior to beginning communication of content from OLT 10 to ONUs 12, 14, 16, etc.). Alternatively, it can be performed from time to time on an as-needed basis, such as whenever another ONU is added to the PON, or on a periodic basis, such as weekly, monthly or yearly, or at any other suitable time. Note that control logic 28, shown in a conceptual manner in FIG. 1, represents the performance of the method illustrated in FIG. 2 under the control of processor 30 and associated elements of other OLT logic 32.

In this exemplary embodiment of the invention, the method comprises two major steps 42 and 44: measuring signal strength, and causing an ONU to transmit a packet having a preamble with a length responsive to the measured signal strength. Although this can be done in various ways that will readily occur to persons skilled in the art in view of the teachings herein, in the exemplary embodiment the strength of a signal received from each ONU 12, 14, 16, etc., is measured, and the preamble length is responsive to the ratio of the highest measured signal strength to the lowest measured signal strength. As noted above, the worst-case occurrence or instance for the OLT 10 to handle is two consecutive packets of greatly differing amplitudes or signal strengths. Thus, setting the packet preamble to a length responsive to a ratio of the highest measured signal strength to the lowest measured signal strength allows OLT 10 to handle the worst-case instance.

Accordingly, at step 46 OLT 10 transmits a command, addressed to a first one of ONUs 12, 14, 16, etc., causing it to respond by transmitting a suitable test signal back upstream to OLT 10. At step 48, OLT 10 measures the strength of that test signal. At step 50, if OLT 10 has not yet measured the strength of all ONUs 12, 14, 16, etc., in the PON, it repeats steps 46 and 48. At steps 52 and 54, OLT 10 determines which of the measured signals has the highest and lowest signal strength, respectively, and at step 56 it calculates the ratio of these values. At step 58, OLT 10 uses the ratio to find a corresponding desired preamble length value in look-up table (LUT) 34 (see FIG. 1). The value stored in LUT 34 can be the actual length in cycles or seconds or some suitable value indicative of the actual length. For the reasons discussed above, the stored values that indicate preamble length increase with an increase in the ratio used to look them up. The values to be pre-stored in LUT 34 can be determined empirically or in any other suitable manner. Although using an LUT in response to a calculated highest-to-lowest ratio is used in the exemplary embodiment, other ways of determining a suitable preamble length in response to measured signal values so as to handle the worst-case instance will occur readily to persons skilled in the art in view of the teachings herein. For example, a processor-executed algorithm could be used.

At step 60, OLT 10 transmits an indication of the preamble length found in LUT 34 as part of a command to each of ONUs 12, 14, 16, etc. In response to this command, any data packet generated thereafter by any of ONUs 12, 14, 16 will have a preamble of the indicated length. In alternative embodiments, an additional step (not shown) can be performed that causes one or both of steps 58 and 60 to be skipped if there is a default preamble length or current preamble length to which each of ONUs 12, 14, 16 has already been set that is the same as or close to the desired preamble length.

Figure 3:
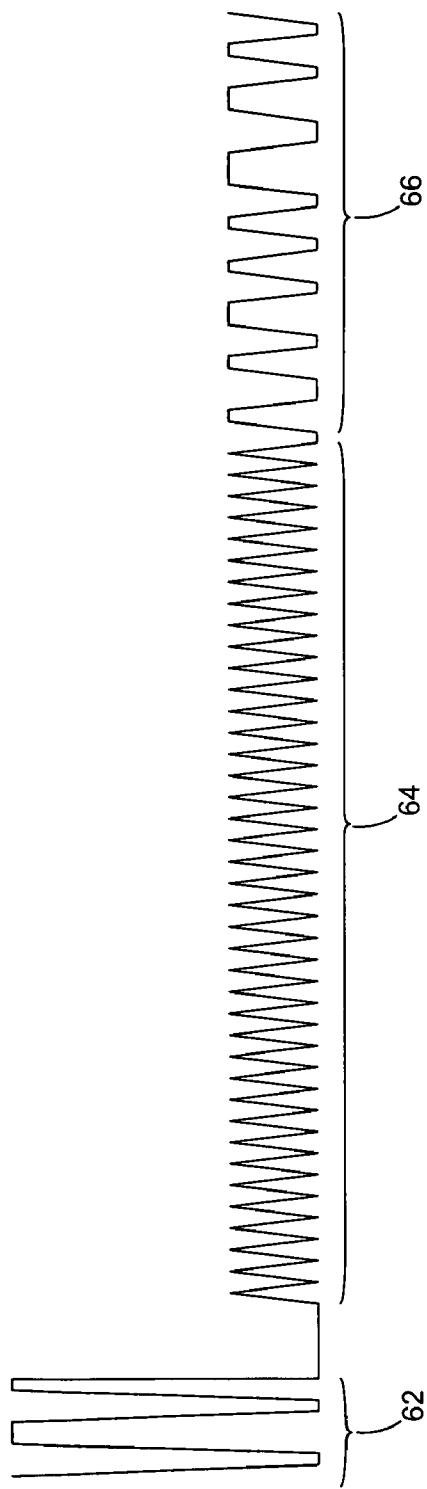
Figure 4:
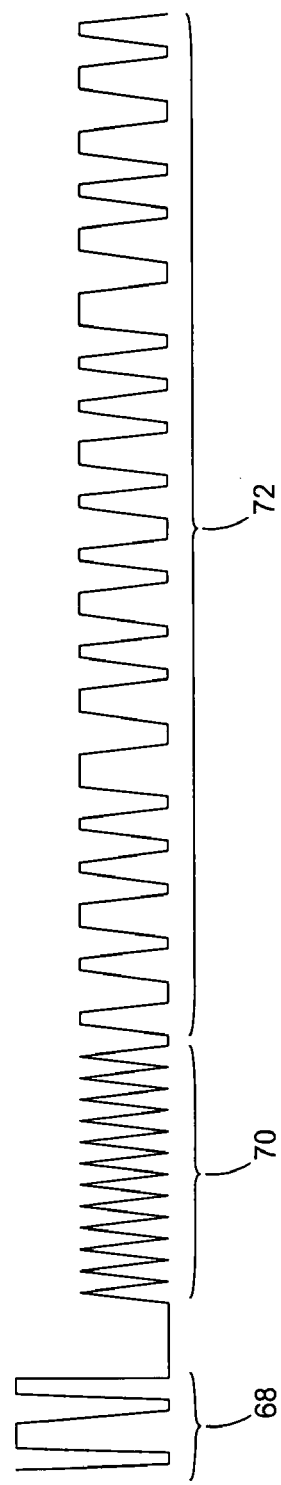
FIG. 4 illustrates exemplary data packets having short preambles adjusted in accordance with the method of FIG. 2.

Exemplary results of the above-described method are illustrated in FIGS. 3-4. As illustrated in FIG. 3, in an instance in which the worst-case amplitude (i.e., signal strength) difference between one packet (only the tail end 62 of which is shown for purposes of illustration) and another packet is large, the preamble 64 of the packet (and all other packets) is correspondingly long relative to the data portion 66 of the packet (and all other packets). However, as illustrated in FIG. 4, in an instance in which the worst-case amplitude difference between one packet (only the tail end 68 of which is shown for purposes of illustration) and another packet is small, the preamble 70 of the packet (and all other packets) can be correspondingly short relative to the data portion 72 of the packet (and all other packets). It can readily be seen that optimizing the preamble length of all packets transmitted from ONUs 12, 14, 16, etc., to OLT 10 in the above-described manner maximizes the bandwidth available for the packet data portions.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for adjusting a data transmission packet preamble length in an optical network, wherein the packet comprises a preamble followed by data bits, comprising the steps of:

measuring a signal strength of a signal received from at least one optical network unit (ONU) in the optical network at an optical line terminator (OLT); and causing the at least one ONU to transmit a packet having a preamble with a length responsive to the measured signal strength.

2. The method claimed in claim 1, wherein:

the step of measuring a signal strength comprises measuring a signal strength of signals received from a plurality of ONUs in the optical network; and the step of causing the at least one ONU to transmit a packet having a preamble with a length responsive to the measured signal strength comprises causing each of the plurality of ONUs that transmits a packet to transmit a packet having a preamble with a length responsive to the measured signal strength.

3. The method claimed in claim 2, wherein:

the step of measuring a signal strength comprises measuring a signal strength of signals received from all ONUs in the optical network; and the step of causing the at least one ONU to transmit a packet having a preamble with a length responsive to the measured signal strength comprises causing all ONUs in the optical network that transmit packets to transmit packets having preambles with a length responsive to the measured signal strength.

4. The method claimed in claim 2, wherein the optical network is a passive optical network (PON).

5. A method for adjusting a data transmission packet preamble length in an optical network, wherein the packet comprises a preamble followed by data bits, comprising the steps of:

measuring a signal strength of a signal received from at least one optical network unit (ONU) in the optical network at an optical line terminator (OLT); and causing the at least one ONU to transmit a packet having a preamble with a length responsive to the measured signal strength, wherein the step of causing the at least one ONU to transmit a packet having a preamble with a length responsive to the measured signal strength comprises:

generating a preamble length indication responsive to the measured signal strength; and transmitting a message containing the preamble length indication from the OLT to the ONU; and the ONU generating, in response to the message, a packet having a preamble with a length indicated by the preamble length indication.

6. The method claimed in claim 5, wherein the step of generating a preamble length indication responsive to the measured signal strength comprises determining the preamble length indication from a look-up table in response to the measured signal strength.

7. The method claimed in claim 5, wherein:
the step of measuring a signal strength comprises measuring a signal strength of each signal received from each ONU in the optical network;
the step of transmitting a message comprises transmitting a message containing the preamble length indication from the OLT to each ONU in the optical network; and
the step of the ONU generating, in response to the message, packets having preambles with a length indicated by the preamble length indication comprises each ONU in the optical network that transmit a packet to generate, in response to the message, a packet having a preamble with a length indicated by the preamble length indication.

8. The method claimed in claim 7, wherein the step of generating a preamble length indication responsive to the measured signal strength comprises:
determining a highest signal strength of among all signals received from all ONUs in the optical network;
determining a lowest signal strength of among all signals received from all ONUs in the optical network;
calculating a ratio of highest signal strength to lowest signal strength; and
determining the preamble length indication in response to the ratio.

9. The method claimed in claim 8, wherein the step of determining the preamble length indication in response to the ratio comprises determining the preamble length indication from a look-up table in response to the ratio.

10. A method for adjusting a data transmission packet preamble length in a passive optical network (PON), wherein the packet comprises a preamble followed by data bits, comprising the steps of:
measuring a signal strength at an optical line terminator (OLT) of each signal received from each ONU in the PON;
determining a highest signal strength of among signals received from the ONUs in the PON;
determining a lowest signal strength of among signals received from the ONUs in the PON;
calculating a ratio of the highest signal strength to the lowest signal strength;
determining a preamble length indication in response to the ratio;
transmitting a message containing the preamble length indication from the OLT to each ONU in the PON; and
an ONU in the PON generating, in response to the message, a packet having a preamble with a length indicated by the preamble length indication.

11. An optical line terminator that adjusts a data transmission packet preamble length in an optical network, wherein the packet comprises a preamble followed by data bits, comprising:
an optical data transceiver system for receiving signals from and transmitting signals to one or more optical network units in the optical network;
a signal strength measuring system for measuring a strength of a signal received from an optical network unit (ONU); and
a processing system for determining a preamble length indication responsive to the measured signal strength, generating a message containing the preamble length indication, and causing the optical data transceiver system to transmit the message to the ONU.

12. The optical line terminator claimed in claim 11, wherein the processing system determines the preamble length indication from a look-up table in response to the measured signal strength.

13. The optical line terminator claimed in claim 11, wherein the processing system determines a highest signal strength of among signals received from the ONUs in the optical network, determines a lowest signal strength of among signals received from the ONUs in the optical network, calculates a ratio of highest signal strength to lowest signal strength, and determines the preamble length indication in response to the ratio.

14. The optical line terminator claimed in claim 13, wherein the processing system determines the preamble length indication from a look-up table in response to the ratio.

* * * * *

UNITED STATES PATENT AND TRADEMARK OFFICE
CERTIFICATE OF CORRECTION

PATENT NO. : 7,606,490 B2  Page 1 of 1
APPLICATION NO. : 11/292131
DATED : October 20, 2009
INVENTOR(S) : Dalton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Fourteenth Day of December, 2010

David J. Kappos
*Director of the United States Patent and Trademark Office*